Figure 3:
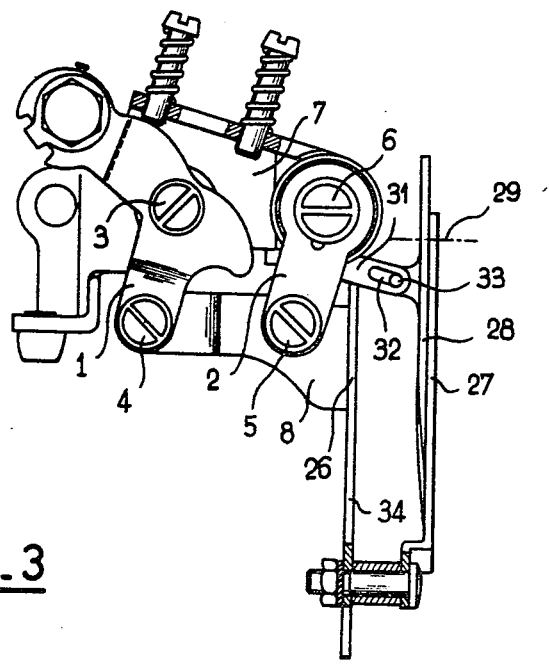

United States Patent [19]

Huret

[11] 4,362,522
[45] Dec. 7, 1982

[54] DERAILLEUR FOR A CHAINWHEEL ASSEMBLY FOR A BICYCLE

[76] Inventor: Roger H. M. Huret, Nanterre, France

[21] Appl. No.: 98,384

[22] Filed: Nov. 29, 1979

[30] Foreign Application Priority Data

Dec. 4, 1978 [FR] France .................... 78 34143

[51] Int. Cl.³ .............. F16H 11/08; B62M 9/12
[52] U.S. Cl. .................................... 474/82
[58] Field of Search ........... 474/82, 81, 80, 79, 474/78

[56] References Cited

U.S. PATENT DOCUMENTS

| 3,890,847 | 6/1975 | Dian | 474/80 |
| 4,078,444 | 3/1978 | Huret | 474/82 |
| 4,194,409 | 3/1980 | Nagano | 474/80 |
| 4,199,997 | 4/1980 | Isobe | 474/82 |
| 4,199,998 | 4/1980 | Isobe | 474/82 |
| 4,226,130 | 10/1980 | Isobe | 474/82 |
| 4,237,743 | 12/1980 | Nagano | 474/82 |

FOREIGN PATENT DOCUMENTS

| 1112659 | 5/1968 | United Kingdom | 474/82 |
| 1269430 | 4/1972 | United Kingdom | 474/82 |
| 1338657 | 11/1973 | United Kingdom | 474/82 |
| 1425158 | 2/1976 | United Kingdom | 474/82 |
| 1501585 | 2/1978 | United Kingdom | 474/82 |
| 1507364 | 4/1978 | United Kingdom | 474/82 |

OTHER PUBLICATIONS

UK Patent Application No. 2,036,895, published Jul. 2, 1980, (Applicant: Roger H. M. Huret).

Primary Examiner—Allan D. Herrmann
Attorney, Agent, or Firm—Wolf, Greenfield & Sacks

[57] ABSTRACT

This invention relates to a chainwheel derailleur for a bicycle, characterized in that at least one of the fingers of the fork member is mounted pivotally on an axis perpendicular to its plane.

9 Claims, 7 Drawing Figures

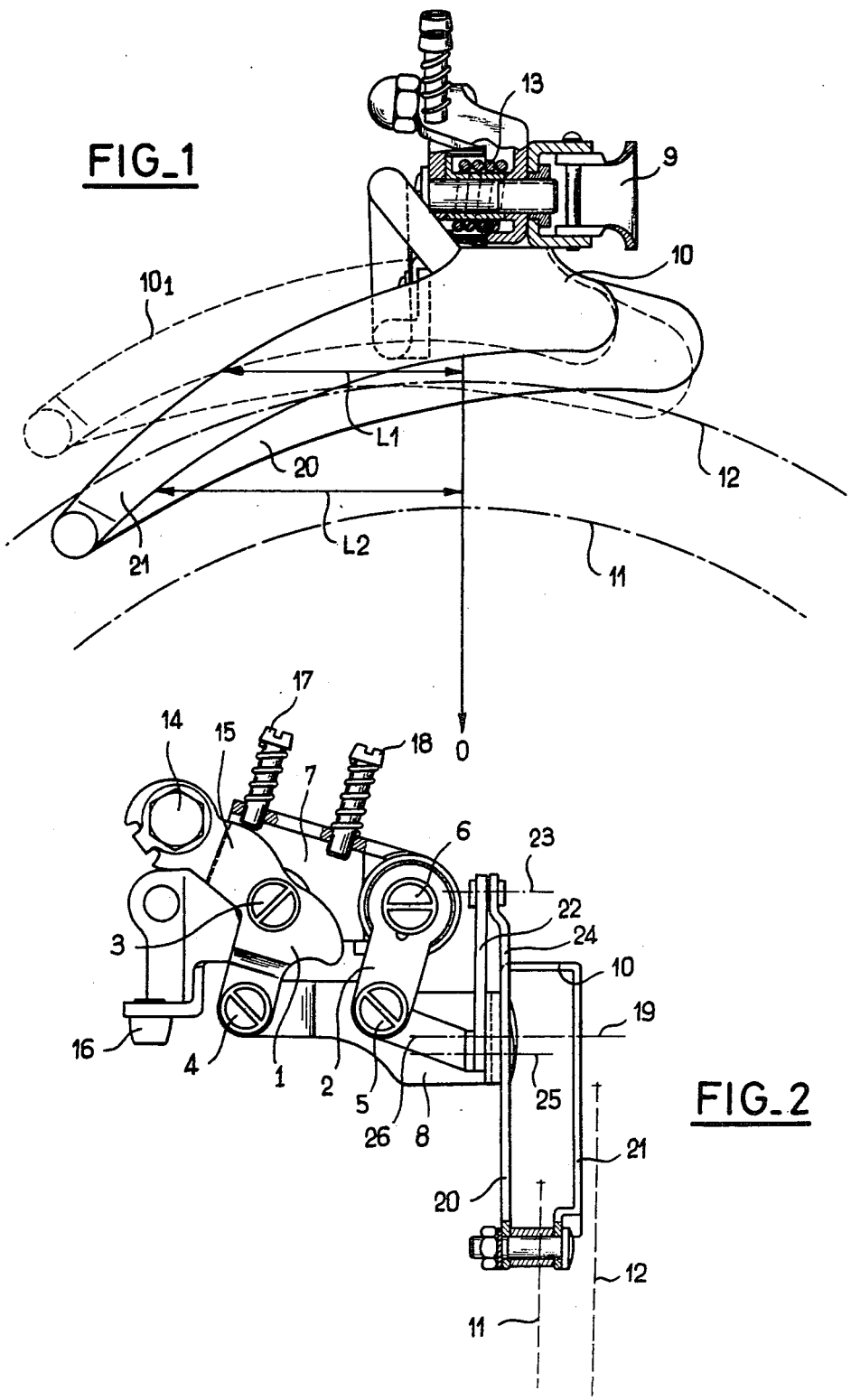
FIG_1
FIG_2

DERAILLEUR FOR A CHAINWHEEL ASSEMBLY FOR A BICYCLE

The present invention concerns a chainwheel derailleur for a bicycle.

Chainwheel derailleurs which have been produced hitherto comprise a fork member which extends on respective sides of the run of the bicycle chain, which is subjected to the traction drive force. The fork member is displaced transversely with respect to the plane of the chain in order to move the chain from one chainwheel to the adjacent chainwheel which is of a different diameter.

Hitherto however, the chainwheels used on the same chainwheel assembly have only a relatively small difference in diameter, as the guide fork member must be positioned so as to pass over the larger-diameter chainwheel, so that it is not possible to achieve the desired reduction in the diameter of the smaller chainwheel, as that would result in an increase in the length of the run of the chain which is between that chainwheel and the active region of the fork member, and such an increase in the length of the run of the chain, bearing in mind the lateral flexibility of the chain, would make it difficult, if not impossible, to shift the chain on to the smaller-diameter chainwheel of the chainwheel assembly.

The foregoing disadvantages are overcome by illustrative embodiments of the invention in which a conventional, deformable-parallelogram chainwheel derailleur is, in accordance with the invention, provided with a guide fork member mounted on a pivot so that the fork member can rotate about an axis perpendicular to its plane. As the derailleur parallelogram is deformed to move the guide fork member between chainwheels of the chainwheel assembly, an actuating member connected to the parallelogram assembly rotates the fork member around the axis in order to bring it in close proximity to each chainwheel. The close proximity of the guide fork to each chainwheel prevents the chain from falling off the chainwheels during the shifting operation and provides for smoother shifting and more accurate operation of the mechanism.

In accordance with another feature of the invention, the pivotally mounted finger of the fork member comprises the finger which is most remote from the actuating means.

In accordance with another feature of the invention, the pivoting finger of the fork member comprises a pivotal portion and a fixed portion.

In accordance with another feature of the invention, the whole of the fork member is pivotally mounted.

Figure 4:
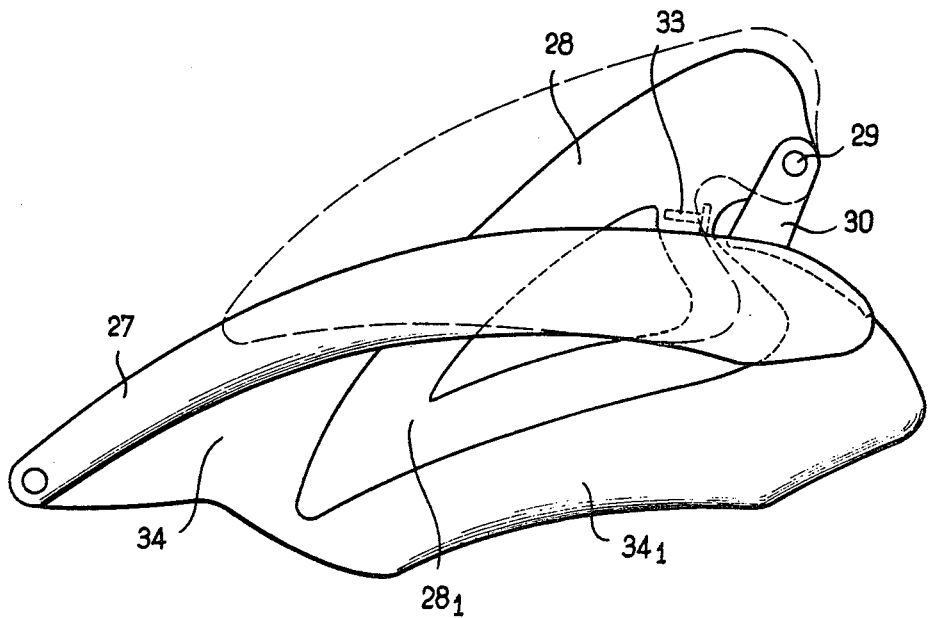
Figure 5:
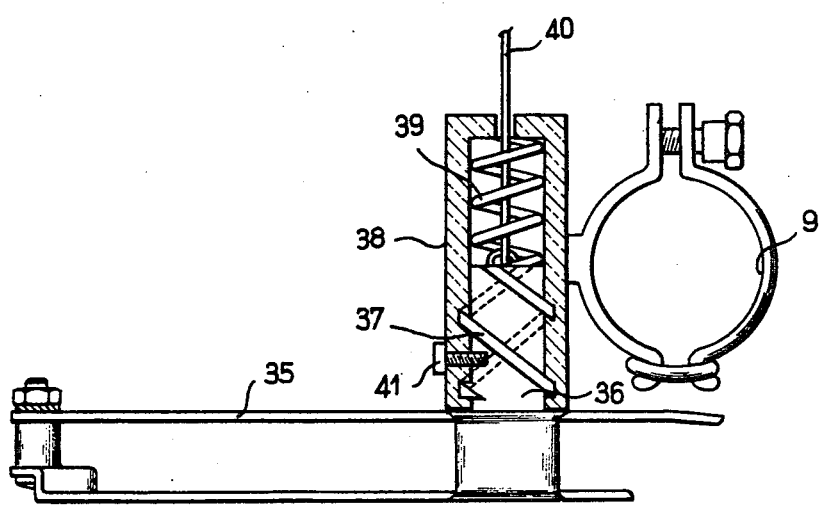
Figure 6:
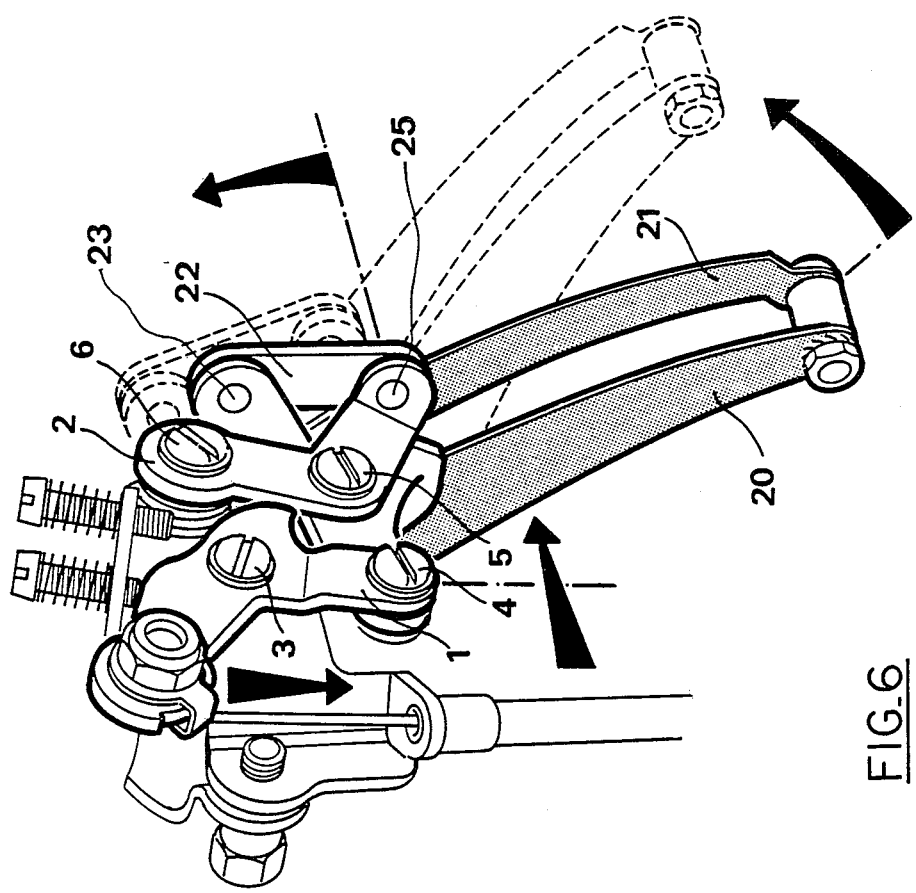
Figure 7:
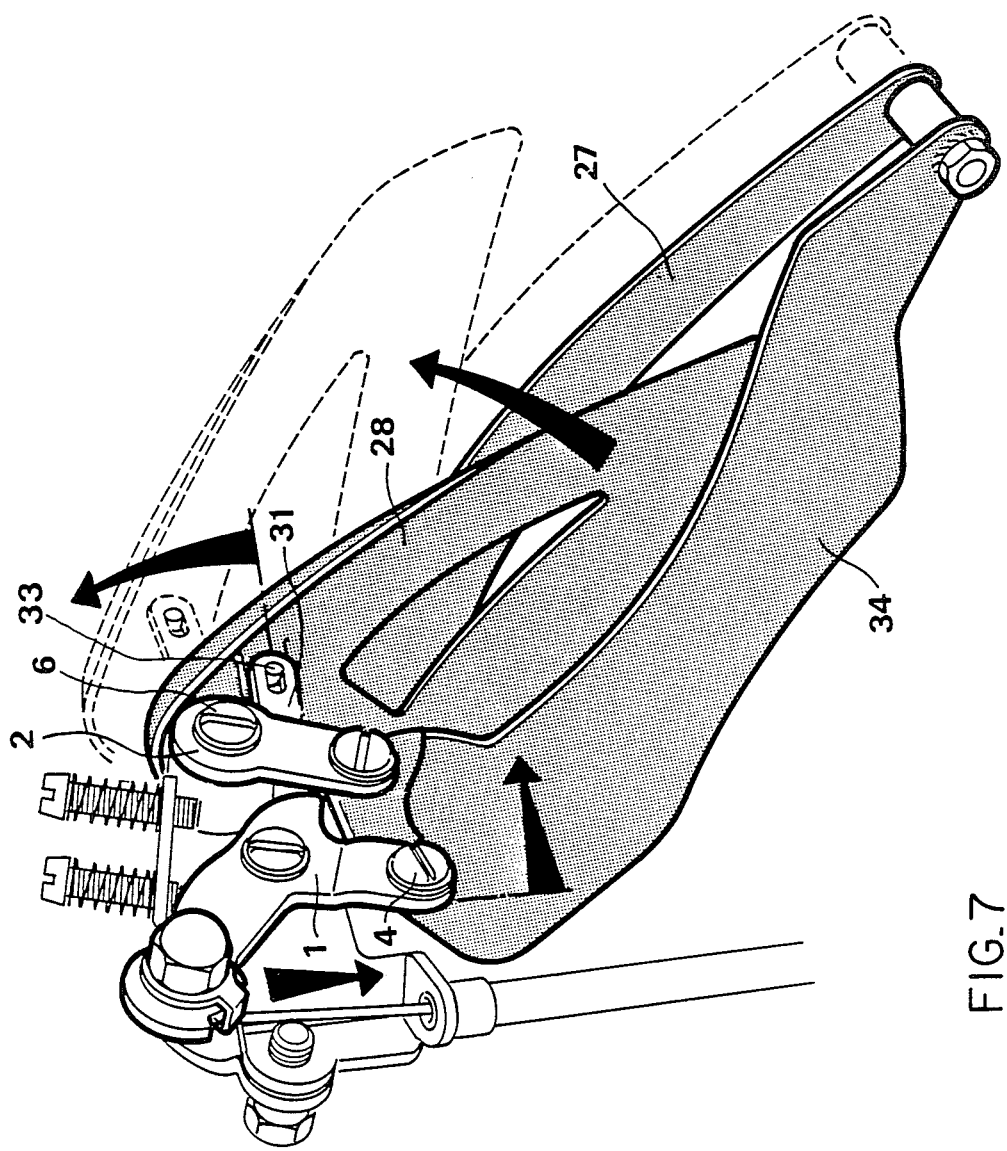

The invention is shown by way of non-limiting example in the accompanying drawings in which:

FIG. 1 is a side view in partial cross-section of a chainwheel derailleur according to the invention, FIG. 2 is a view seen from the left in FIG. 1, FIG. 3 is a view from above of another embodiment of the derailleur according to the invention, FIG. 4 is a view of the fork member of the derailleur, as viewed from the right in FIG. 3, FIG. 5 is a side view in partial cross-section of another embodiment of the derailleur according to the invention, FIG. 6 is a perspective view of the embodiment of the invention illustrated in FIGS. 1 and 2, and FIG. 7 is a perspective view of the embodiment of the invention illustrated in FIGS. 3 and 4.

The present invention therefore concerns a chainwheel derailleur for a bicycle which, being applied to the run of the chain which is subjected to the traction loading, upstream of the chainwheels of the chainwheel assembly, can apply a lateral traction force to the chain, such force being such that the chain can quickly and surely pass on to the smaller-diameter chainwheel of the chainwheel assembly, in spite of the substantial difference in diameter which may exist between that chainwheel and the adjacent chainwheel.

This derailleur therefore makes it possible to extend the gear range of the bicycle, which is achieved by operating the chainwheel assembly derailleur, without impairing the speed and accuracy with which the position of the chain is changed.

In the embodiment shown in FIGS. 1 and 2, the chainwheel derailleur shown is a parallelogram-type derailleur and for this purpose comprises two links which are mounted pivotally by way of their ends 3, 4 and 5, 6 respectively, on two carriers 7 and 8 which define the two other arms of the deformable parallelogram.

The carrier 7 is provided with a clamping collar 9 for fixing it to a tube of the bicycle frame while the carrier 8 carries the fork member 10 which extends, in known manner, on respective sides of the run of the chain which is subjected to the traction drive force, upstream of the chainwheels 11 and 12 of the chainwheel assembly, the chainwheels being of different diameter.

Disposed around the shaft 6 is a coil return spring 13 which is connected by one of its ends to the carrier 7 and by its other end to the arm 2 of the parallelogram so as to tend constantly to return the deformable parallelogram and therefore also the fork member 10 to the position shown in solid lines in FIGS. 1 and 2.

This deformable parallelogram-type derailleur is actuated by a cable, one end of which is connected by means of a screw 14 to the end of the extension portion 15 of the arm 1 and which also passes through an eye member 16 which, for example, forms a stop for the outer sheath of the control cable.

The carrier 7 also carries screws 17 and 18 which cooperate with the levers 1 and 15 on each side of the pivot shaft 3 in order to form stops for limiting the degree of deformation of the deformable parallelogram.

In accordance with the invention, the fork member 10 is mounted pivotally on the carrier 8 by means of an axis 19 which is perpendicular to the plane of the fork as shown in the accompanying drawings by the plane of the chainwheels 11 and 12 of the chainwheel assembly.

Moreover, the fork member 10 which is pivotal about axis 19 is connected to the deformable parallelogram in such a way that, for each of its transverse positions which move it to the level of the chainwheels 11 or 12, the fork member 10 also assumes an angular position such that the inner and outer fingers 20 and 21 thereof move towards the periphery of the small-diameter chainwheel 11 when the chain shifts from the larger-diameter chainwheel 12 on to the chainwheel 11.

This change in the angular position of the fork member is shown in FIG. 1 from which it will be seen that the fork member 10 occupies the position $10_1$ shown in broken lines when it is positioned in the plane of the larger-diameter chainwheel 12, whereas the fork member 10 occupies the position shown in solid lines when it is positioned in the plane of the smaller-diameter chainwheel 11.

It will also be seen that when the fork member 10 is disposed in the plane of the larger-diameter chainwheel 12, it acts laterally on the drive run of the chain by means of a portion which is of length $L_1$ of the drive run of the chain, whereas, when the fork member is disposed in the plane of the smaller-diameter chainwheel 11, the fork member acts laterally on the drive run of the chain over a length $L_2$ which may be different from the length $L_1$ of the drive run of the chain.

Therefore, the chain can be moved from a larger-diameter chainwheel on to a smaller-diameter chainwheel correctly, in spite of the substantial difference in the diameters of the chainwheels.

The derailleur, according to the invention, can advantageously be used with chainwheel assemblies which comprise more than two chainwheels, by improving in particular the movement of the chain on to the smallest-diameter chainwheel, which is the most difficult operation to perform, in view of the substantial difference in diameter between the smallest and the largest of the chainwheels.

Indeed, shifting of the chain from a small chainwheel on to a large chainwheel may be improved by increasing the height of the inner finger 20 of the fork member, this being the finger which is active in this operation, but the same construction cannot be used for shifting the chain from a large chainwheel on to a small chainwheel, as the outer finger of the fork member must pass over the larger-diameter chainwheel.

According to the invention, a conventional deformable-parallelogram derailleur is modified to provide a solution to this problem by causing the fork member 10 and, in particular, the outer finger 21 to rotate about its axis 19 when the chain is being moved between chainwheels. Since the finger 21 is the finger which is active when moving the chain from a large chainwheel onto a smaller chainwheel, the rotational motion results in the finger 21 being brought into closer proximity to the chainwheels at the shifting positions, resulting in a more accurate transfer of the chain between the chainwheels.

In the embodiment shown in FIGS. 1 and 2, rotational movement of the fork member 10 is achieved by means of an assembly which includes arm 2 and its right-angle extension 26, link 22 and extension arm 24. Link 22 is pivotally connected at one end to an extension portion 24 of fork member 10 and is pivotally connected at the other end to a tab bent at right-angles to arm 26 as shown in FIGS. 1 and 2.

By means of arms 22, 24 and 26 the fork member 10 is caused to rotate around its axis 19 when the deformable parallelogram, comprised of links 1, 2, 7, and 8, is deformed in order to shift the chain from one chainwheel to another. In particular, in accordance with the well-known operation of a deformable-parallelogram derailleur, a cable (previously described) is connected to screw 14 and pulls the screw towards the stop 16 in order to shift the chain from the inner to the outer chainwheel. When tension on the cable is released, a spring 13 causes the chain to move from the outer to the inner chainwheel. The action of the cable causes the arm 1 to rotate around its pivot screw 3. The rotational motion of arm 1 in turn causes the screw 4 and the carrier 8 to move to the right thereby transferring the chain from the chainwheel centered at position 11 to the chainwheel centered at position 12 in FIG. 2. In accordance with the well-known operation of this type of derailleur, arm 2 also swings around its pivot point 6 to the right as the derailleur mechanism shifts from position 11 to position 12.

In accordance with the invention, as screw 5 moves towards the right, arm 26, which is connected in a right angle arrangement with link 2, moves with an upward motion and, in particular, swings in an arcuate path around the pivot screw 6. The upward motion at the end of arm 26 is transferred to link 22 which, in turn, is given an upward motion. The motion of link 22 is imparted to the extension portion 24 of the fork member via the pivotal connection at 23. The motion of the extension portion 24 causes the fork member 10 to pivot around its axis 19 into the dotted position $10_1$ shown in FIG. 1. When the derailleur mechanism moves toward the left, the opposite motion occurs and the fork member rotates into the solid position 10 as shown in FIG. 1.

The pivotal connections 23 and 25 are provided with sufficient clearance to permit transposition of the arcuate movement of the arm 26 into a pivotal movement in a plane of the arm 24, for which purpose the pivotal connections 23 and 25 may be formed by swivel joints.

FIG. 6 is a perspective view showing the embodiment of FIGS. 1 and 2 illustrating the operation of the fingers 20 and 21.

The embodiment shown in FIGS. 3 and 4 shows an embodiment of the chainwheel derailleur wherein only the outer finger of the fork member is mounted pivotally, the outer finger being in fact the only active finger when shifting the chain on to a smaller-diameter chainwheel, this being because chainwheel assemblies carry chainwheels which are stepped in such a way that the chainwheel of largest diameter is disposed at the most outward position relative to the bicycle.

In this embodiment, the fork member 26 is rigidly fixed to the carrier 8 which forms an integral part of the deformable parallelogram, the corners of which are defined by the axes at 3, 4, 5 and 6.

However, the outer finger of the fork member is formed by a fixed portion 27 and a movable portion 28, the movable portion 28 being mounted pivotally about an axis 29 on an extension portion 30 of the fork member, the pivotal movement of the portion 28 being produced from the arm 2 of the deformable parallelogram by means of a lug 31 on the arm 2, the lug having an elongate opening 32 for receiving a finger 33 which is fixed with respect to the movable portion 28.

As with the previous embodiment, motion of the carrier 8 to the right causes arm 2 to move to the right, in turn, causing lug 31 to swing upwardly in an arcuate path around pivot 6. The upward motion of the end of arm 31 is imparted to pin 33 which, in turn, causes moveable portion 28 to pivot around its pivot 29 into the position shown in the dotted lines in FIG. 4. Similarly, motion of the carrier 8 to the right returns moveable portion 28 to the position shown in the solid lines in FIG. 4.

The shape and dimensions of the movable portion 28, and the extent of its pivotal movement, are so determined that the lower active region $28_1$ of the movable portion 28 passes below the fixed portion 27 in order to follow the difference in the diameters of the chainwheels when the fork member moves from a large-diameter chainwheel to a small-diameter chainwheel.

On the other hand, the shapes, dimensions and extent of movement of the movable portion 28 are so determined that the lower region $28_1$ of the movable portion 28 moves into a position in which it is hidden behind the fixed portion 27 when the fork member 26 is moved into the plane of the larger-diameter chainwheel.

In fact, in this case the chain is guided by the fixed portion 27 of the fork member, whose curvature is so determined as substantially to correspond to the radius of curvature of the larger-diameter chainwheel.

As will also be seen from FIG. 4, the inner finger 34 of the fork member has a lower region $34_1$ which is greater in height than the fixed portion 27 of the outer finger, the difference in height between the finger 34 and the portion 27 preferably substantially corresponding to the difference in the diameters of the two larger chainwheels of the chainwheel assembly.

FIG. 7 is a perspective view of the embodiment of the invention illustrated in FIGS. 3 and 4 with the incorporation of arrows to indicate the direction of movement of the parts.

In the example shown in FIGS. 1 to 4, the translatory movement and pivotal movement of the fork member is produced by a deformable parallelogram.

However, it would also be possible to use any other means, and for example the pivotal movement can be produced by a ramp or inclined surface means cooperating with a finger, one of the ramp means and the finger being provided on the fork member and the other being provided on a support member which is itself displaced with a translatory motion in order to permit the transverse displacement of the fork member.

The above ramp means may be, for example, in the form of a screw, and such an embodiment is diagrammatically shown in FIG. 5.

In the FIG. 5 embodiment, the fork member 35 is fixed with respect to a shaft 36 which is provided on its outside surface with a helicoidal ramp means 37 which is housed in screwthreads of corresponding shape which are provided in the inside surface of a guide sleeve 38.

The shaft 36 is subjected to the opposing forces of a spring 39 and a traction cable 40 which is connected at another position to a control lever.

In this embodiment, the spring 39 tends constantly to urge the shaft 36 outwardly of the sleeve 38 whereas the cable 40 tends in contrast to oppose such movement.

In such an embodiment, it will be seen that, by releasing the cable 40, the spring 39 pushes the shaft 36 outwardly, the effect of which is also to cause pivotal movement of the fork member 35.

The translatory movement of the fork member 35 is therefore accompanied by a pivotal movement which permits it to move from one chainwheel of a chainwheel assembly to a chainwheel of a different diameter, with the length of the drive run of the chain which extends between the fork member and each chainwheel being kept substantially constant.

A pointed screw 41 which is disposed in a helicoidal groove in the shaft 36 may also be provided in order to limit the extent of the movement of the fork member 35.

I claim:

1. A chainwheel derailleur for a bicycle comprising a guide fork member, having two fingers, each of said fingers lying substantially in a plane, and extending on a respective side of the traction drive run of the chain upstream of the chainwheels, the fork member being movable transversely with respect to its plane under the action of an actuating means, characterised in that one at least of the fingers of the fork member is mounted pivotally to rotate about an axis perpendicular to its plane and means is provided for rotating said one of said fingers about its axis in response to the action of the actuating means.

2. A derailleur according to claim 1 characterised in that the pivotally mounted finger of the fork member comprises the finger which is most remote from the actuating means.

3. A derailleur according to claim 1 characterised in that the pivoting finger of the fork member comprises a pivotal portion and a fixed portion.

4. A derailleur according to claim 1 characterised in that both fingers are mounted pivotally.

5. A derailleur according to claim 3 characterized in that the pivotal portion of the pivoting finger is connected for actuation thereof to the actuating means which provides for transverse displacement of the fork member.

6. A derailleur according to claim 5 characterised in that the actuating means providing for transverse displacement of the fork memeber comprises a deformable parallelogram, one of the arms of which is connected by a linkage system to the pivotal finger of the fork member.

7. A derailleur according to claim 5 characterised in that the connection between the pivotal portion of the pivoting finger and the actuating means is formed by a ramp means.

8. A derailleur according to claim 7 characterised in that the actuating means comprises a sliding shaft and the ramp means is formed by a helicoidal ramp means.

9. A derailleur according to claim 8 characterised in that the helicoidal ramp means is formed on the sliding shaft.

* * * * *